Figure 1:
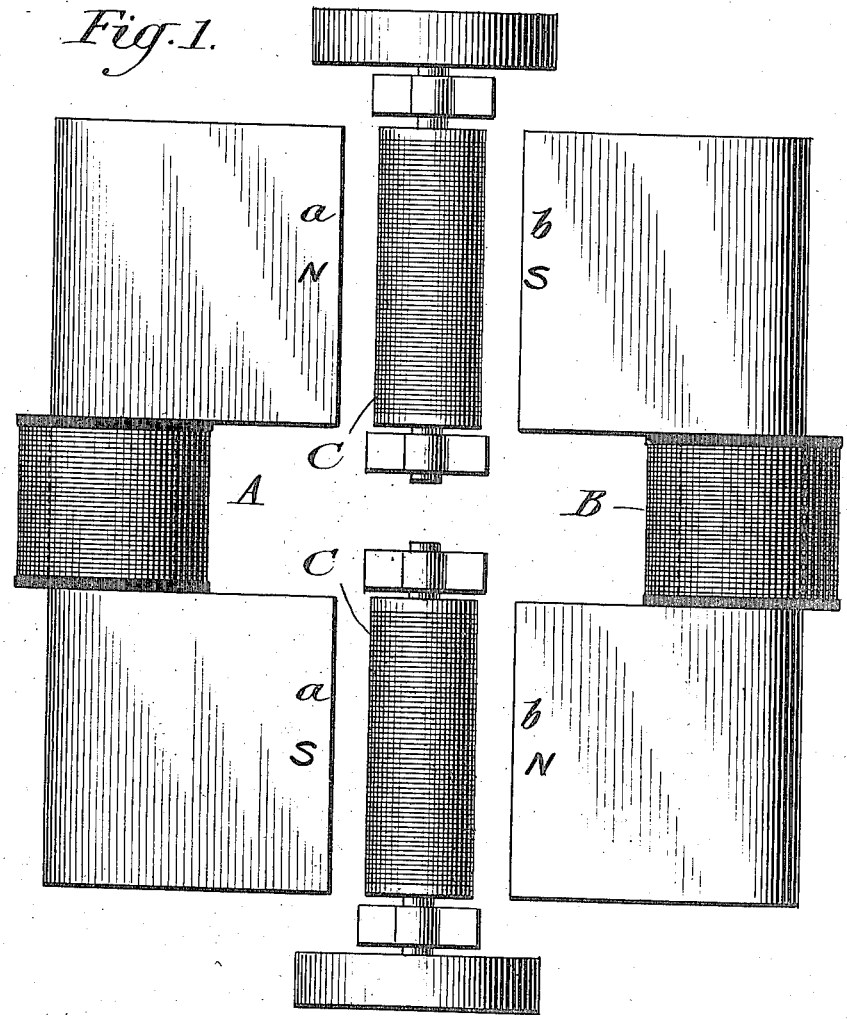

L. G. ROWAND.
MAGNETIC SEPARATOR.
APPLICATION FILED JAN. 27, 1903. RENEWED DEC. 12, 1912.
1,068,453.
Patented July 29, 1913.
9 SHEETS—SHEET 2.
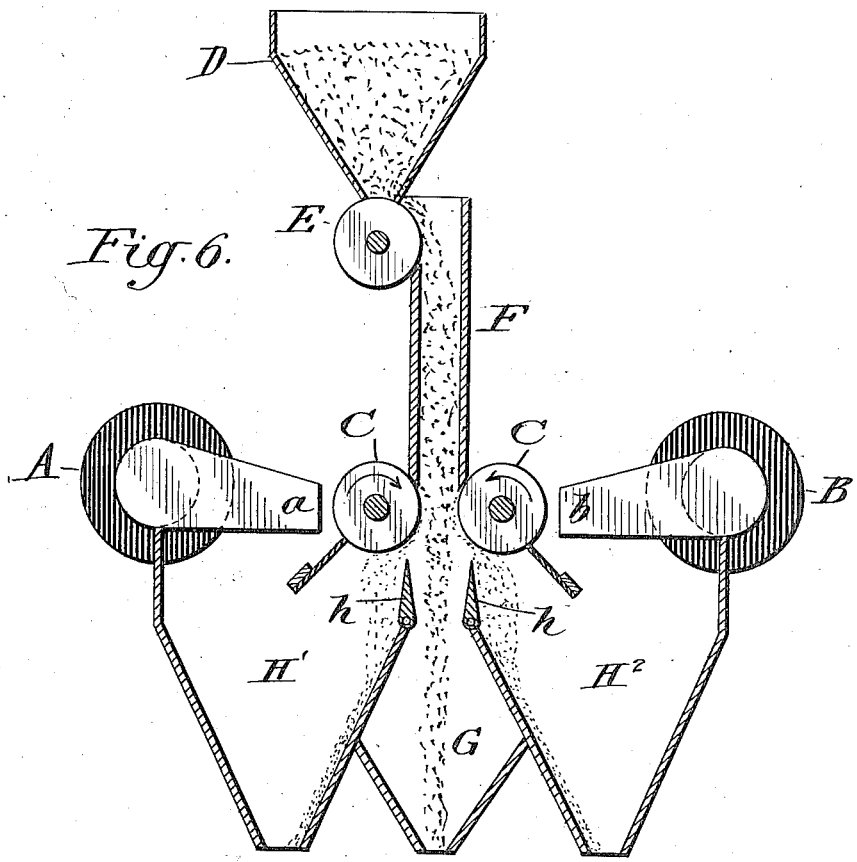
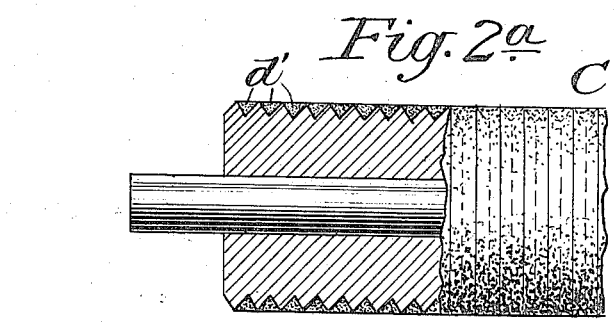

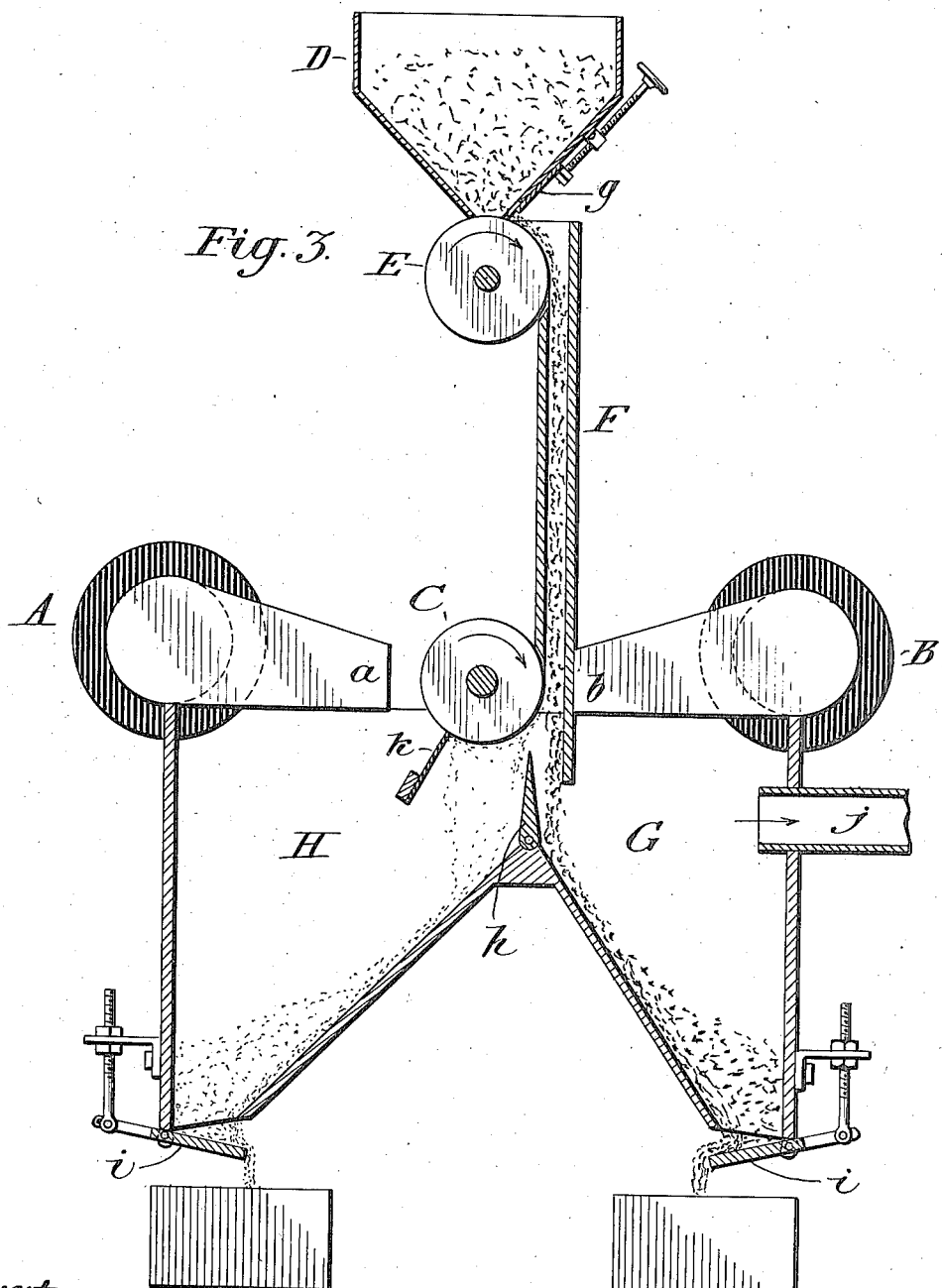

L. G. ROWAND.
MAGNETIC SEPARATOR.
APPLICATION FILED JAN. 27, 1903. RENEWED DEC. 12, 1912.

1,068,453.

Patented July 29, 1913.
9 SHEETS—SHEET 4.

Witnesses:
Chas. J. O'Neill
W. Beall Williams

Inventor:
Lewis G. Rowand,
by Pennie & Goldsborough
Attys

L. G. ROWAND.
MAGNETIC SEPARATOR.
APPLICATION FILED JAN. 27, 1903. RENEWED DEC. 12, 1912.
1,068,453.
Patented July 29, 1913.
9 SHEETS—SHEET 5.
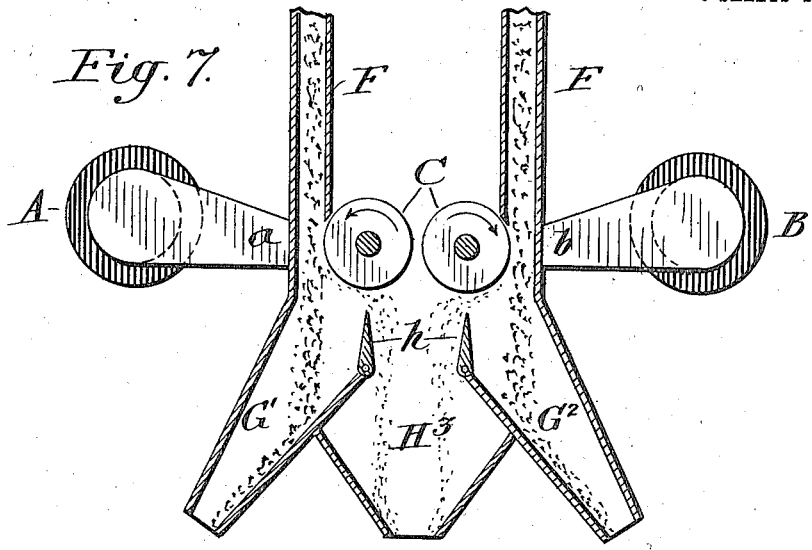
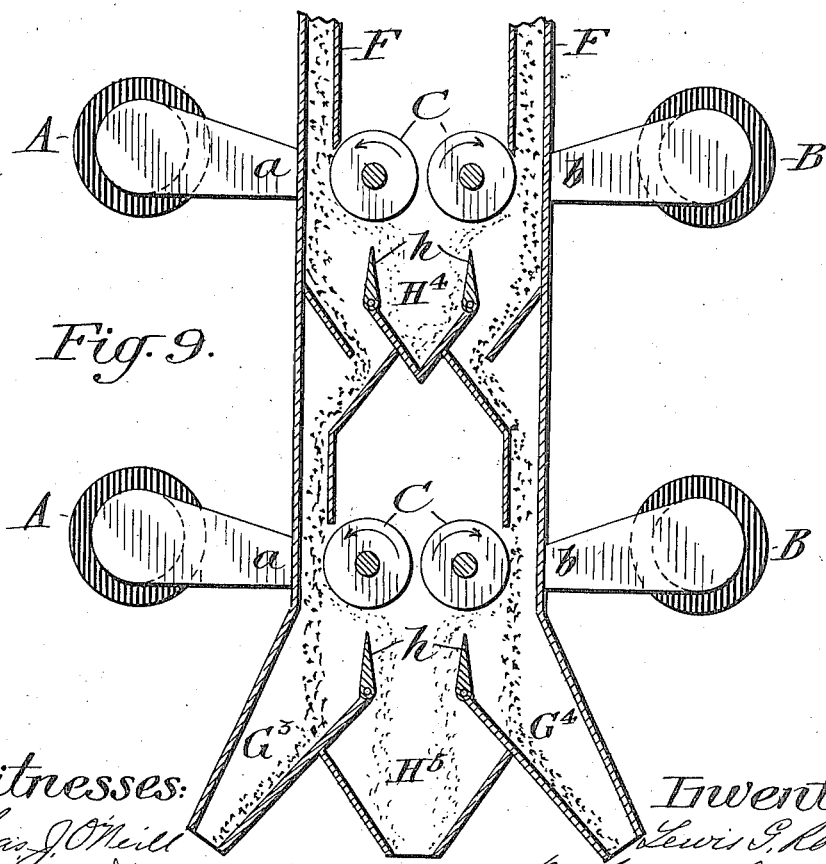

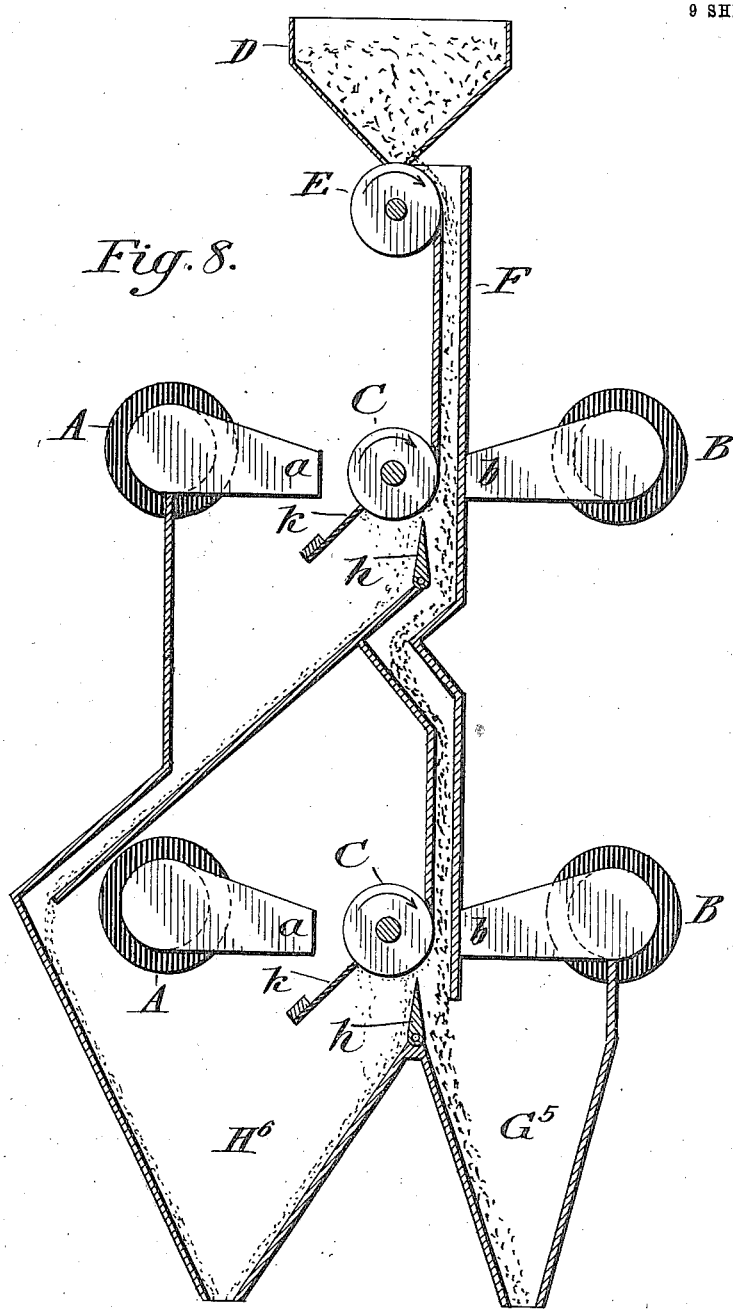

L. G. ROWAND.
MAGNETIC SEPARATOR.
APPLICATION FILED JAN. 27, 1903. RENEWED DEC. 12, 1912.
1,068,453.
Patented July 29, 1913.
9 SHEETS—SHEET 8.
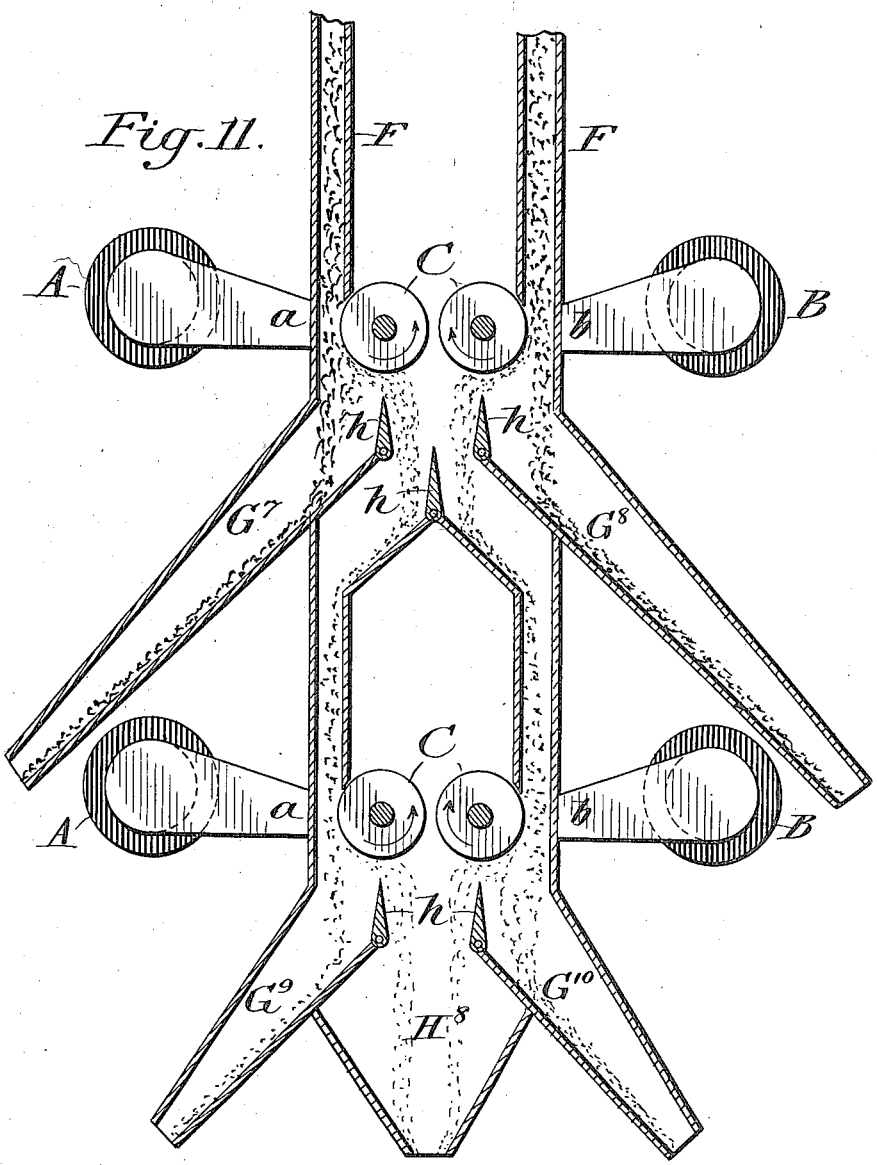

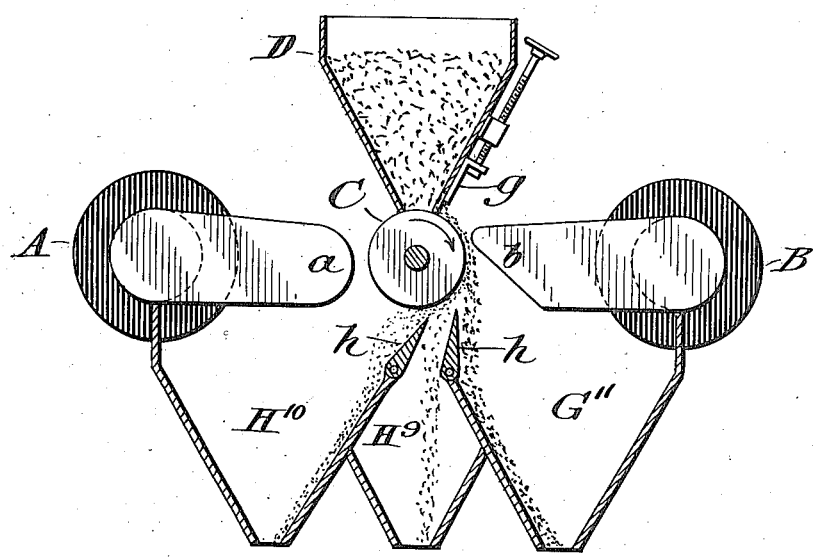
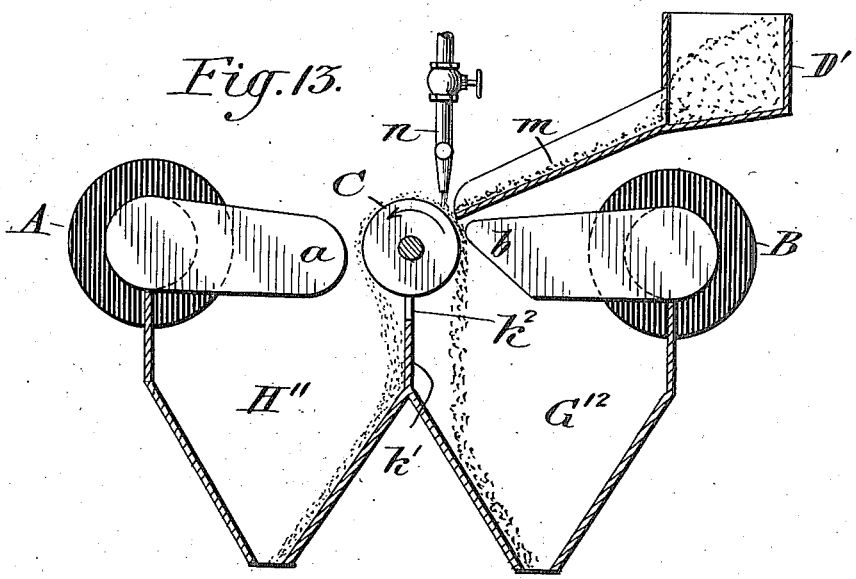

UNITED STATES PATENT OFFICE.

LEWIS G. ROWAND, OF EAST ORANGE, NEW JERSEY, ASSIGNOR TO WETHERILL SEPARATING COMPANY, OF NEW YORK, N. Y., A CORPORATION OF NEW JERSEY.

MAGNETIC SEPARATOR.

1,068,453.      Specification of Letters Patent.      Patented July 29, 1913.

Application filed January 27, 1903, Serial No. 140,689. Renewed December 12, 1912. Serial No. 736,402.

*To all whom it may concern:*

Be it known that I, LEWIS G. ROWAND, a citizen of the United States, residing at East Orange, county of Essex, State of New Jersey, have invented certain new and useful Improvements in Magnetic Separators; and I do hereby declare the following to be a full, clear, and exact description of the invention, such as will enable others skilled in the art to which it appertains to make and use the same.

My invention relates to certain new and useful improvements in magnetic separators. Its main or characteristic feature consists in using as the separating element, an armature rotating freely in a magnetic field, in such manner that magnetism of opposite polarity will be developed within said armature, upon opposite sides of a neutral line or plane, dividing said armature longitudinally. Along the neutral line or plane referred to, the magnetism is practically *nil*, and I make use of this factor, in some forms or modifications of the apparatus, to clear the armature thereat of the attracted particles, without having recourse to auxiliary brushes or cleaning belts. The gradual decrease in the intensity of magnetization from the line or plane of highest magnetization to the neutral line or plane, may also be made available for obtaining a number of fractional separations into heads of different magnetic permeabilities, as will hereinafter more fully appear.

Generically considered, my invention is applicable to the separation of materials of high magnetic permeability, such as magnetite, and also to the separation of materials of such low magnetic susceptibility that they can only be successfully treated in accordance with the well known Wetherill process of magnetic separation.

My invention is also applicable to both wet and dry separation, some of its most advantageous forms being designed to separate, either in the dry way or in the wet way, materials of extremely low magnetic permeability or susceptibility.

Figure 2:
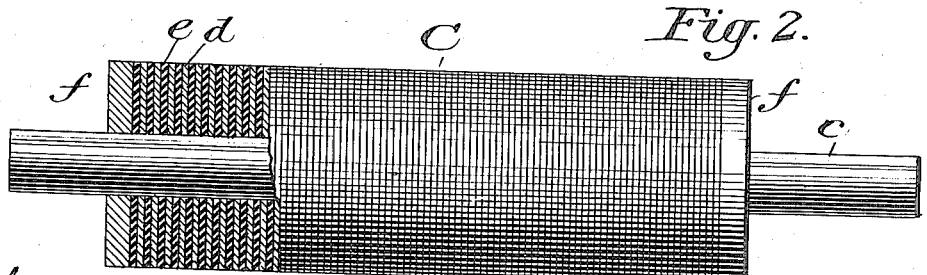
Figure 4:
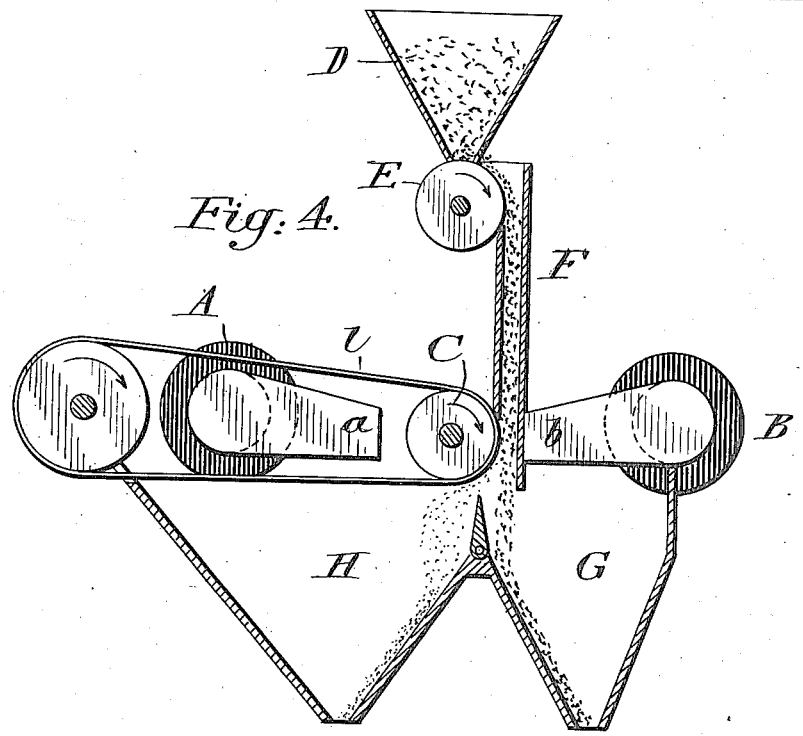
Figure 5:
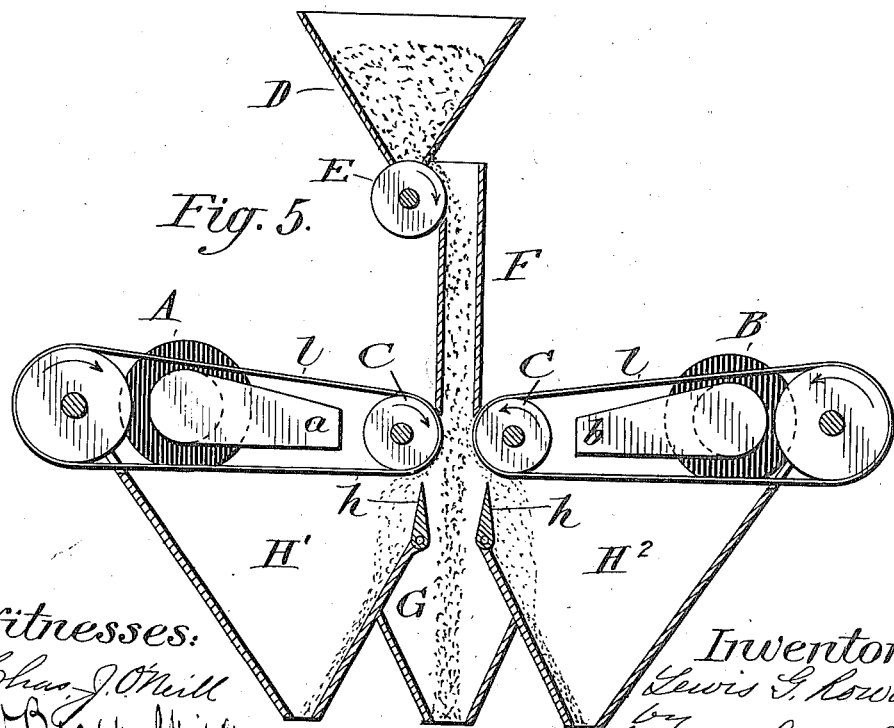
Figure 10:
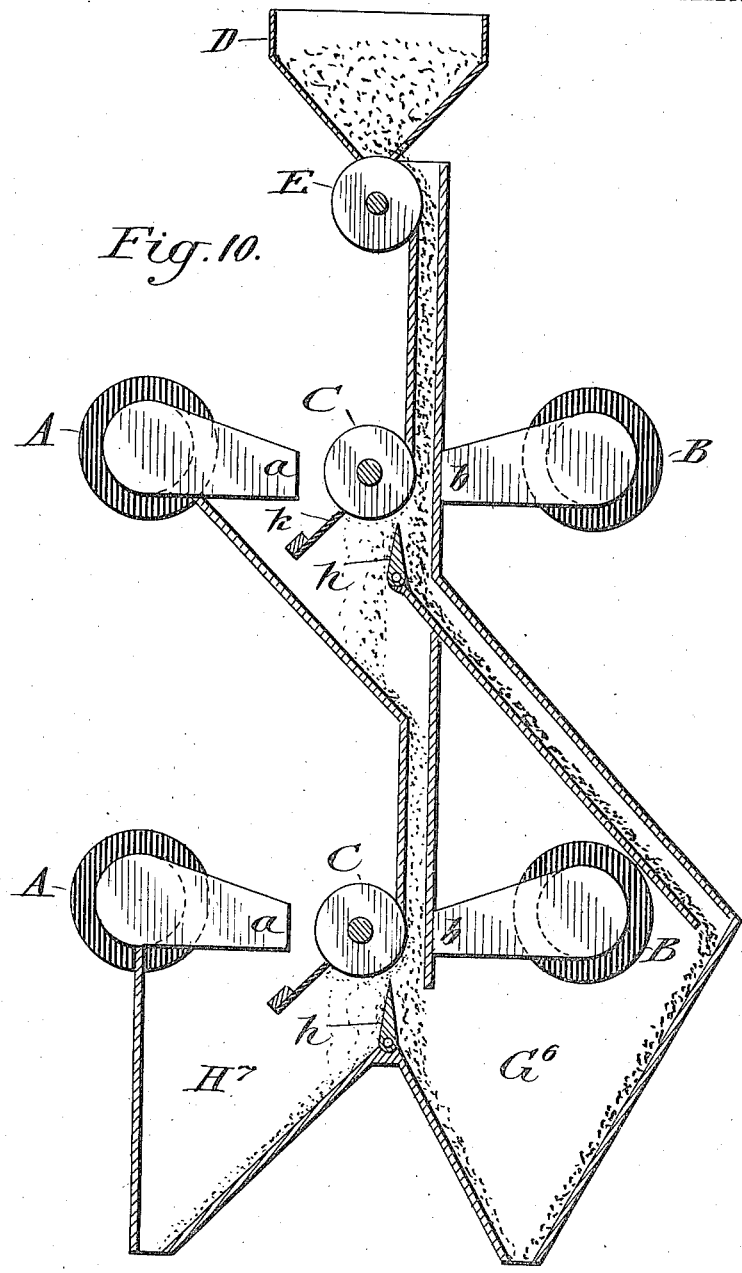

In the accompanying drawings, Figure 1 represents a plan view of the field of magnets and armatures of a magnetic separator constructed in accordance with one form or modification of my invention; Fig. 2 represents, on a somewhat larger scale and partly in section, a suitable construction of armature for the purposes of the invention; Fig. 2$^a$ is a similar view showing a modified form of the armature; Fig. 3 represents a sectional elevation of a magnetic separator constructed in accordance with one form or modification of the invention; Figs. 4, 5, 6 and 7 represent like views of other forms or modifications thereof; Figs. 8 and 9 represent like views of magnetic separators constructed in accordance with my invention and adapted to subject the tailings to a second separation; Figs. 10 and 11 represent like views of magnetic separators constructed in accordance with my invention and adapted to subject the heads to a further separation; Fig. 12 represents a sectional elevation of a magnetic separator constructed in accordance with my invention and adapted particularly to the treatment of materials of low magnetic permeability; and Fig. 13 is a like view of a magnetic separator constructed in accordance with my invention and designed particularly to treat material of low magnetic permeability in the wet way.

Similar letters of reference indicate similar parts throughout the several views.

As hereinbefore indicated, the essential or characteristic feature of the invention consists in subjecting the material to be separated to the action of an armature rotating in a magnetic field, in such manner that, with respect to a neutral line or plane dividing the armature longitudinally, magnetisms of opposite signs are developed in the armature, the intensity of the magnetization diminishing gradually from a plane of highest magnetization to the neutral plane referred to. The armature is so related to the magnetic poles, that the armature alone serves as the separating element.

As shown in Fig. 1, the magnetic field may conveniently consist of opposite pole pieces $a$, $b$, either or both of which may be energized by a suitable coil or coils A, B, and which may have two air gaps as shown, so as to double the capacity of the apparatus for separating purposes. If but one coil, (as, for instance, A), is used, the opposing pole pieces $b$ will nevertheless serve as keepers and conductors of the magnetic flux or circuit through the armatures. If both coils A, B, are employed, it will, of course, be understood that they must be so wound as to develop opposite polarities in the pole pieces $a$ with respect to the pole pieces $b$, as indicated by the letters N, S, in Fig. 1, this relation being the same that would exist if but one coil were employed.

The rotatory armature, as shown in detail in Fig. 2, is laminated. This may be conveniently done by mounting upon the shaft $c$ a series of metal disks $d$, separated by intervening spaces. These spaces may be occupied by a corresponding series of disks $e$ of insulating material, which preferably extend to the outer periphery of the armature as a whole. The series of disks are compressed and held together by the end collars $f$, thereby completing the structure. It will be evident, however, that, from a magnetic standpoint, a similar result will be obtained by providing a solid metal cylinder (see Fig. $2^a$) with a series of transverse annular grooves $d'$, leaving intervening ridges which may, thereafter, be filled with non-magnetic material, as, for instance, brass, lead, or the like. The feature of laminating or grooving the armature is of particular service for the reason that it prevents the overheating of the armature due to the production of eddy currents, and also for the reason that the edges of the magnetic laminæ, or of the magnetic ridges between the non-magnetic filling, present areas of higher concentration of the magnetic lines of force than would be afforded by an unbroken cylindrical magnetic surface, as will be readily understood.

For material of high magnetic permeability or susceptibility, such as magnetite, I prefer to employ the feeding devices shown in Figs. 3 to 10. These feeding devices consist of a hopper D, provided at its discharge end with the feed regulating roller E and the movable gate $g$ (said gate being shown in Fig. 3). The material from the hopper is distributed by the roller E through the vertical chute F. At the base of the chute is located the rotatory armature or armatures C, and it is designed that the speed of rotation of the armature shall be slightly in excess of the velocity of the falling material as it passes the said armature. In Fig. 3, the magnetizable particles or heads are attracted by the armature C and are deposited in the receptacle H, whereas the non-magnetic particles or tailings pass on into the receptacle G, an adjustable wing or gate $h$ determining, by its position, the completeness of the separation. The rotation of the armature is found, in practice, to have a fan suction action, to some extent, upon the falling material, and consequently tends to some degree at least, to draw some of the finer non-magnetic dust into the receptacle H. To obviate this inconvenience, I sometimes find it desirable to provide both of the receptacles G and H with automatic valves or gates $i$, at their discharge ends, and to provide the receptacle G with an exhaust pipe $j$, wherein is maintained an exhaust sufficient to neutralize the fan action of the armature C. I also prefer to provide the magnetic separator shown in Fig. 3 and in some of the remaining figures, with a partition plate $k$ of rubber, or the like, for the purpose of intercepting any particles which might otherwise be carried beyond the neutral line or plane by centrifugal force, and which would otherwise bombard the pole piece and tend to wear it away. In the construction shown in Fig. 4, the same characteristic features are preserved with the exception that, instead of the partition plate $k$, I employ an endless apron $l$, which effectually protects the pole piece against the bombardment referred to. In the construction shown in Fig. 5, the same features are present as in Fig. 4, with the exception that the interpolar space contains two armatures instead of one, the heads being received in the outer receptacles $H'$, $H^2$, and the tailings in the central receptacle G. The construction shown in Fig. 6 is identical with the construction shown in Fig. 5, with the omission of the belts $l$ in said latter figure, and the substitution therefor of the intercepting partitions. The construction shown in Fig. 7 is identical, in so far as the rotatory armatures and magnets are concerned, with the construction shown in Fig. 6, but the material is fed between the rotatory armatures and the pole pieces, and the armatures rotate in such manner that the heads are received in the central receptacle $H^3$ and the tailings in the outer receptacles or chutes $G'$, $G^2$. In Fig. 9, I have illustrated an arrangement whereby the tailings from a separator of the type shown in Fig. 7, are subjected to the further separating action of another separator of the same type, said tailings finally passing into the chutes or receptacles $G^3$, $G^4$, while the heads are collected in the receptacles $H^4$, $H^5$. In Fig. 8, I have illustrated the manner of employing two separators, of the type shown in Fig. 3, for subjecting the tailings to a second separation, the heads being finally received in the receptacle or chute $H^6$ and the tailings in the receptacle or chute $G^5$. In Fig. 10, I have shown the manner of employing two separators, of the type shown in Fig. 3, for subjecting the heads to a second separation, the heads being finally received in the receptacle or chute $H^7$ and the tailings in the receptacle or chute $G^6$.

In Fig. 11, I have shown the application of two separators, of the type shown in Fig. 7, for the purpose of subjecting the heads to a second separation, the heads being finally received in the chute or receptacle H⁸ and the tailings being received in the several chutes or receptacles G⁷, G⁸, G⁹, G¹⁰. The construction and mode of operation of these arrangements for subjecting either the heads or tailings to further separation, is so fully shown in the drawings that further description thereof is unnecessary.

For the treatment of materials of low magnetic susceptibility, I prefer the separators shown in Figs. 12 and 13. In Fig. 12, the material to be treated is fed from the hopper D directly upon the armature C, which rotates in the direction indicated by the arrow, the pole pieces being formed as shown so as to obtain a high concentration of the magnetic lines of force. The tailings are received in the chute or receptacle G¹¹, the first heads in the receptacle H⁹, and the second heads in the receptacle H¹⁰, the movable gates or shutters determining the character of the heads received in the two compartments. This fractional separation of the heads is made possible for the reason that the magnetic material is discharged at different points, according to the relative magnetic permeability of the constituents of said material. The magnetic intensity of any particular part of the armature gradually decreases as that part approaches the neutral axis; so that the particles of relatively lower magnetic permeability fall off first, whereas those of relatively stronger magnetic permeability continue to adhere to the armature and are liberated near the neutral point, where the armature changes polarity and where the attractive force is practically *nil*. By varying the speed of rotation of the aramture, the angle of deflection between the stream of the falling non-magnetic particles and the magnetic particles may be widened, but there is a practical limit to this increase of angular velocity of the armature, because of the fact that the centrifugal force developed tends to throw off the weakly magnetic material. While I have shown the apparatus of Fig. 12 as applied to the separation of dry magnetic material, yet it is also applicable to the separation of wet magnetic material provided that the armature and magnet poles, together with the receiving receptacles, are immersed in a water tank. In Fig. 13, the magnetic separator shown is designed particularly for wet separation, and especially for the separation of wet pulp or similar fine material, which could not be so well separated in a wet way by the apparatus shown in Fig. 12. The pulp is supplied from the hopper D' to the incline m, and is delivered upon the surface of the armature C which rotates in the direction indicated by the arrow, *i. e.* in an opposite direction to the direction of rotation used in the apparatus of Fig. 12. The magnetic constituents of the pulp are attracted and held by the rotating armature and are conveyed upward and over the highest point of the armature, while the non-magnetic tailings flow down the feed side of the roller. At or near the lowest point of the armature, and at about the neutral line or plane thereof, the partition $k'$, provided with a light elastic strip of rubber or the like, bears slightly against the armature, thus preventing any portion of the heads from being carried on into the tailings receptacle. To free the magnetic pulp from any non-magnetic material mechanically carried along or entangled therewith, a spray pipe $n$, or the like, is provided just above the point of feed, so as to wash out such tailings with water and carry them down into the tailings receptacle G¹². The heads are received, as indicated, in the heads receptacle H¹¹.

What I claim is:—

1. A magnetic separator, provided with a field magnet, having opposing pole pieces, a rotatory armature located in the interpolar gap and in inductive relation to the pole pieces, a gravity feed for dropping the material to be separated in proximity to the armature, said gravity feed consisting of an upper hopper and feed roller, and a vertical chute leading therefrom and substantially tangent at its lower portion to the rotatory armature, and means for driving the armature at a speed greater than the velocity of the falling material and in the same direction therewith, substantially as described.

2. A magnetic separator, provided with a field magnet having opposing pole pieces, a rotatory armature located in the interpolar gap, a gravity feed for dropping the material to be separated in proximity to the armature, and means for driving the armature at a speed greater than the velocity of the falling material and in the same direction therewith substantially as described.

3. A magnetic separator, provided with a field magnet having opposing pole pieces, a plurality of rotatory armatures located in the interpolar gap, a gravity feed for dropping material to be separated between the armatures, and means for driving the armatures at speeds greater than the velocity of the falling material and in the same direction therewith; substantially as described.

4. A magnetic separator, provided with a field magnet having opposing pole pieces, a plurality of rotatory armatures located in the interpolar gap and in inductive relation to the pole pieces, a gravity feed for dropping material to be separated between the armatures, said gravity feed consisting of an upper hopper and feed roller, and a vertical chute leading into the interpolar space between the armatures, and means for driving the armatures at speeds greater than the velocity of the falling material and in the same direction therewith; substantially as described.

5. In a magnetic separator, the combination with a magnet, of poles of opposite polarity on said magnet, a substantially horizontal shaft mounted to revolve between said poles, an armature placed upon said shaft, permeable projections on said armature, means for feeding material to be separated between one of said poles and said armature, and means for revolving said armature.

6. In a magnetic separator, the combination with an axially rotatable cylindrical armature having permeable projections thereon, of magnet poles external to said armature facing the same in such position that the armature in rotating carries such projections successively past said poles, one of said poles having a face which, below the axis of the cylinder, is formed to lie beyond a vertical plane tangent to said cylinder, and means for feeding material to be separated between the last mentioned pole and cylinder.

7. In a magnetic separator, the combination of poles of opposite polarity, a substantially horizontal shaft, and an armature mounted thereon adapted to revolve between said poles, said poles being external to said armature, inductively magnetizable projections on the surface of said armature, said projections being of such shape and spaced from one of said poles such a distance that the material will be attracted from said pole to said projection, means for rotating said armature and means for feeding material to be separated between said pole and the armature.

In testimony whereof I affix my signature, in presence of two witnesses.

LEWIS G. ROWAND.

Witnesses:
   FRANZ MEYER,
   GUSTAV HARTMANN.